United States Patent
Uddenberg et al.

(10) Patent No.: US 8,116,147 B1
(45) Date of Patent: Feb. 14, 2012

(54) METHODS AND STRUCTURES FOR TESTING SAS-2 SPEED OPTIONS IN SPEED NEGOTIATION WINDOWS

(75) Inventors: David T. Uddenberg, Colorado Springs, CO (US); Gabriel L. Romero, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1359 days.

(21) Appl. No.: 11/691,240

(22) Filed: Mar. 26, 2007

(51) Int. Cl.
*G11C 7/00* (2006.01)
(52) U.S. Cl. .................. 365/189.11; 365/189.05
(58) Field of Classification Search ............. 365/189.11, 365/189.05
See application file for complete search history.

(56) References Cited

U.S. PATENT DOCUMENTS 7,774,424 B1 * 8/2010 Bailey et al. .................. 709/211
* cited by examiner

*Primary Examiner* — Michael Tran
(74) *Attorney, Agent, or Firm* — Duft Bornsen & Fishman LLP

(57) ABSTRACT

Method and structures provide for testing a SAS link during speed negotiation windows to determine success/failure in using a negotiated speed at one or more configured sets of speed options. For each device linked to a master SAS device, each possible set of speed options is configured; the device participates in a speed negotiation window operation with the current speed options configured. One or more SCSI requests are forwarded from the master device to the attached device. The SCSI requests may be non-destructive of data stored on the attached device. Results of the tests may be used to select a preferred speed for communication between the master device and that attached device. The speed options to be varied and tested may include: link speed; spread spectrum clocking for each SAS speed; type of supported spread spectrum clocking; and logical link rate in support of multiplexing.

17 Claims, 5 Drawing Sheets

METHODS AND STRUCTURES FOR TESTING SAS-2 SPEED OPTIONS IN SPEED NEGOTIATION WINDOWS

RELATED APPLICATIONS

The patent application is related to, commonly owned patent application Ser. No. 11/691,195 filed on the same day and entitled METHODS AND STRUCTURES FOR TESTING SAS TRANSCEIVER TRAINING OPTIONS IN SAS-2 TRAINING WINDOWS now issued as U.S. Pat. No. 7,805,554 which is hereby incorporated by reference.

FIELD OF THE INVENTION

The invention relates to serial attached SCSI ("SAS") communications and more specifically relates to improvements in use of SAS-2 speed negotiation windows to test various configurations of speed options for supported SAS speeds between two devices.

BACKGROUND

In SAS communications one or more SAS initiator devices may be coupled to one or more SAS target devices through zero or more SAS expanders to form a SAS domain. In general, SAS initiator devices may initiate or request an initial connection to a particular identified SAS target device. Prior to initiating or requesting such a connection, devices within the SAS domain must perform initial processing to establish one or more mutually supported speeds for communication between any pair of connected devices. In general, each SAS device (initiator, target, or expander) may support one or more SAS speeds for communication with other SAS devices coupled to its PHYs. SAS specifications provide for a variety of SAS speeds standardized for communications between SAS devices. Some devices may support only one or a few lower speeds, other devices may support only one or a few higher speeds, and many devices support a broad spectrum of high and/or low SAS speeds.

The process of establishing the mutually supported speeds that may be used for communication between any two devices is referred to as speed negotiation. In the currently evolving SAS-2 specifications, each device must support processing during a speed negotiation window. The speed negotiation process in the specification defines signals exchanged between a pair of SAS devices to determine one or more SAS speeds supported by both devices in a particular desired link. If multiple speeds are supported by both devices, the highest supported speed is generally utilized if performance is critical while a slower speed may be utilized if reliability is more important than communication speed.

As presently specified in the evolving SAS-2 specifications, processing during the speed negotiation window exchanges signals between a pair of SAS devices and simply identifies all the potential speeds that are supported by both devices. In addition to the SAS speed, the evolving SAS-2 specifications specify a number of speed options that may be modified in support of each SAS speed. These speed options include, for example, whether or not spread spectrum clocking is supported for each SAS speed, the type of spread spectrum clocking supported, and the logical link rate requested in support of SAS-2 multiplexing. The SAS-2 specifications and other related background material generally known to those of ordinary skill in the art is readily available at www.t10.org and other public locations and sites.

Interoperability of SAS devices from various vendors is an ongoing challenge. In particular, in view of the various speed options that may be specified for each SAS speed, the challenge of interoperability is further exacerbated. As presently specified in the evolving SAS-2 specifications, there is little assurance that a particular SAS speed, though mutually supported by both devices, will provide reliable exchanges between the pair of devices. One vendor may utilize particular default speed options settings while another vendor may prefer other default speed option settings for the same SAS speed. Nothing in the present evolving version of the SAS-2 specifications provides for relief from this interoperability challenge.

It is evident from the above discussion that an ongoing need exists to improve reliability of transfers between a pair of SAS devices by assuring that a mutually supported SAS speed will provide a desired level of both performance and reliability.

SUMMARY

The present invention solves the above and other problems, thereby advancing the state of the useful arts, by providing methods and associated structure to test all speed option settings for each mutually supported SAS speed between a pair of communicating SAS devices. Features and aspects hereof provide for such testing in conjunction with speed negotiation window processing between a pair of coupled SAS devices. Testing of each set of speed options for each mutually supported SAS speed may include the exchange of SCSI requests and responses between the pair of SAS devices. Results of the testing may then be utilized by automated or manual administrative procedures to select a preferred SAS speed and an associated set of preferred speed options for communication between the pair of SAS devices.

DETAILED DESCRIPTION OF THE DRAWINGS

Figure 1:
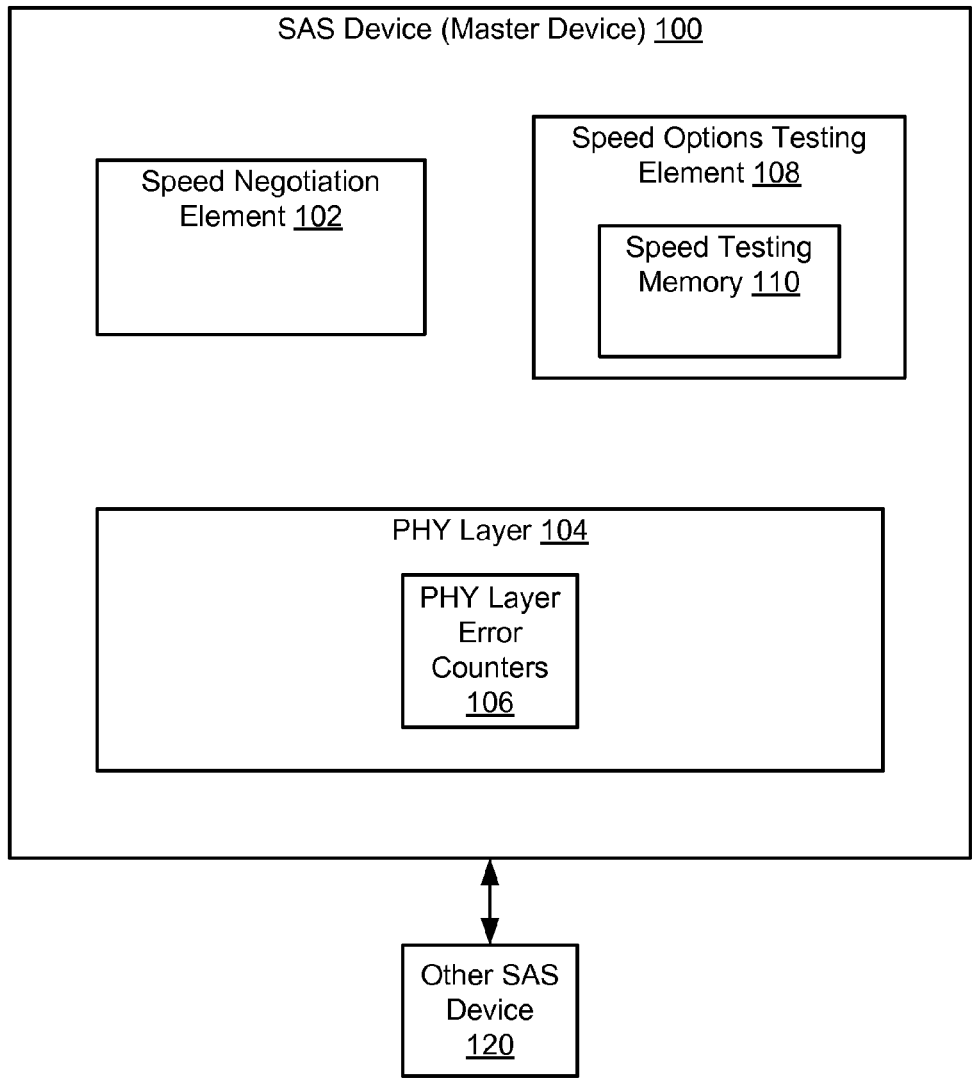
FIG. 1 is a block diagram of a SAS device enhanced in accordance with features and aspects hereof to test various configured sets of speed options for each supported SAS speed in speed negotiations.

FIG. 1 is a block diagram of an exemplary SAS device 100 enhanced in accordance with features and aspects hereof to perform testing of each supported SAS speed during the speed negotiation processing. The SAS device 100 may also be referred to herein as a "master" device in that, as regards the speed negotiation process, device 100 is the device controlling and performing the speed negotiation processing to determine which of its supported speeds are also supported by the attached SAS device.

SAS device 100 may include a speed negotiation element 102 for performing speed negotiation by participating in a speed negotiation window in accordance with SAS-2 specifications and in accordance with features and aspects hereof. SAS speed negotiation element 102 is coupled to and co-operable with PHY layer 104. PHY layer 104 performs standard state machine processing as specified in the SAS specifications to control physical layer operation of the communication media coupling device 100 to other SAS device 120. PHY layer 104 may include error counters 106 for counting the number of detected errors in the PHY layer communication processing. As will be discussed further herein below, the error counters may be used in accordance with features and aspects hereof to determine the success or failure of a particular SAS speed and each associated set of speed options for use between the master device 100 and the other SAS device 120.

Speed negotiation element 102 within SAS device 100 may be associated with speed options testing element 108 adapted to test various sets of speed options for each SAS speed supported by master device 100. The speed testing memory 110 may be used for storing information regarding various possible combinations of speed option settings and may be used for recording associated test results for each tested combination of speed settings for each SAS speed tested by speed options testing element 108 in conjunction with operation of speed negotiation element 102 on behalf of master device 100.

In operation, SAS device 100, when initialized such as at start of day or power on reset processing, first determines which of the various SAS speeds it supports are also supported by the other SAS device 120 coupled to its PHY layer 104. Speed negotiation processing is generally specified by the SAS-2 specifications to be performed under a SAS-2 defined protocol during a speed negotiation window. As specified therein and as well known to those of ordinary skill in the art, SAS device 100 instructs its PHY layer 104 to exchange various signals with other SAS device 120 to indicate the supported speeds within master device 100. Other SAS device 120 may respond with appropriate signals to indicate those speeds also supported by other SAS device 120. In general, SAS device 100 may construct a list of mutually supported SAS speeds and then select from the list of supported speeds a preferred speed for operation of the communication link between SAS device 100 other such device 120.

In accordance with features and aspects hereof, the list of mutually supported SAS speeds may be constructed and maintained in speed testing memory 110. Further, speed options testing element 108 is operable to sequence through each of the mutually supported speeds and test every combination of speed options associated with each mutually supported speed. Those of ordinary skill in the art will readily recognize that every possible set of speed options may be configured and tested or some lesser subset of the possible combinations of options may be tested. The lesser subset of possible speed options may be determined as appropriate for the particular application of the SAS device 100. For example, certain application environments known to require higher reliability and/or known to be particularly noisy environments may avoid utilizing higher speed, lower reliability speed options settings. Or, for example, portable applications having limited power may utilize only speed options settings that help conserve scarce power resources. The particular sets of speed options to be tested may be selected as a matter of design choice well known to those of ordinary skill in the art.

As noted above and as discussed further herein below, speed options testing element 108 may be operable to test each SAS speed and each combination of associated speed options by transmitting suitable SCSI requests from the master device 100 to the other SAS device 120. The request and corresponding response may be exchanged with each configured set of speed options for each mutually supported SAS speed. The SCSI request is communicated from SAS device 100 to other SAS device 120. The response generated therefrom is evaluated by SAS device 100 to determine the success or failure of the particular configured set of speed options at the particular, configured, mutually supported SAS speed.

Operation of speed options testing element 108 may utilize speed testing memory 110 to construct a list of the supported SAS speeds and combinations of sets of speed options. The resulting list indicates SAS speeds and associated speed option settings that are not only mutually supported but also verified by testing of speed options testing element 108. The resulting list of tested, verified SAS speeds and associated speed options settings may be communicated to an administrative process or user to select a speed for the particular application of SAS device 100. Further, the list of tested and supported SAS speeds may also be utilized by an automated process or agent within SAS device 100 to automatically select among the options represented by the list of supported, tested SAS speeds and associated speed option settings. The selection of a supported/tested SAS speed and speed option setting may therefore be performed by any suitable means as a matter of design choice.

Those of ordinary skill in the art will readily recognize that the particular functional/modular decomposition of functional and physical elements within SAS device 100 is intended merely as exemplary of one possible embodiment of features and aspects hereof. Numerous alternative and equivalent functional and modular decompositions will be readily apparent to those of ordinary skill in the art as a matter of design choice. In particular, the integration or separation of speed negotiation element 102 relative to PHY layer 104 may be determined as a matter of design choice in a particular embodiment of features and aspects hereof.

Figure 2:
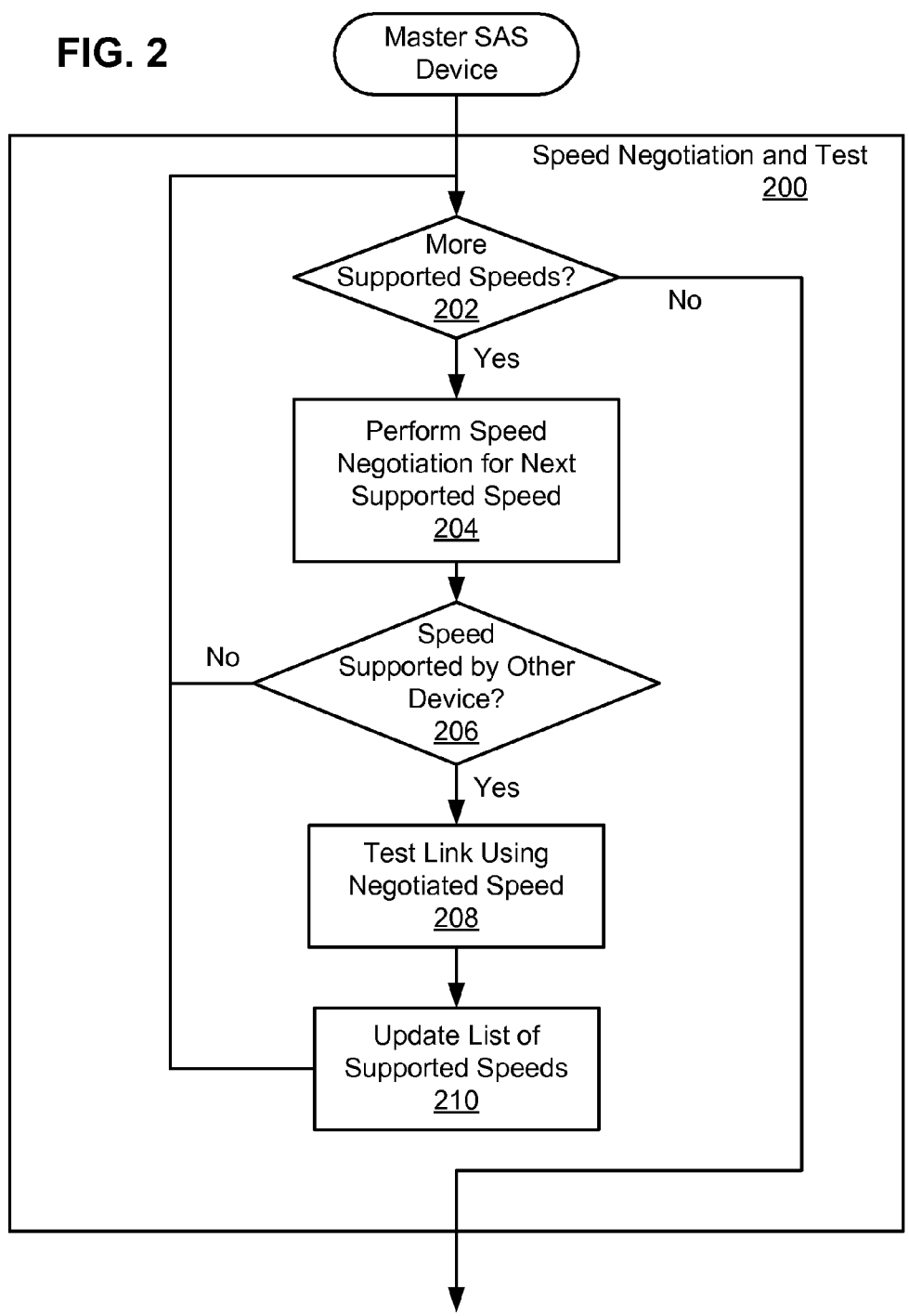
FIGS. 2-5 are flowcharts of methods in accordance with features and aspects hereof to test various configured sets of speed options for each supported SAS speed in speed negotiations.

FIG. 2 is a flowchart describing a method in accordance with features and aspects hereof for improved speed negotiation within a master SAS device. In accordance with features and aspects hereof, the master device performs speed negotiation and test processing 200. Speed negotiation processing of element 200 is generally in accordance with the SAS-2 specifications while test processing of element 200 is in accordance with enhanced features and aspects hereof. As is known to those of ordinary skill in the art, the SAS-2 specifications call for speed negotiation to be performed by participating in a speed negotiation window defined as an aspect of the SAS protocol. Signals are exchanged between the master SAS device and an attached SAS device during the negotiation window to determine a list of mutually supported SAS speeds. In accordance with features and aspects hereof the speed negotiation and test element 200 is enhanced to include testing of each mutually supported SAS speed at each of one or more possible combinations of SAS speed options. Thus, speed negotiation and test element 200 includes iterative steps to test each mutually supported SAS speed and to generate a list of mutually supported SAS speeds that have passed the test to verify operation at the associated speed.

Element 202 is first operable to determine whether additional SAS speeds supported by the master SAS device remain to be negotiated and tested to verify mutual support by the other SAS device and to verify proper operation of the mutually supported speeds. If no further SAS speeds remain to be negotiated and tested, processing of element 200 is complete and the master SAS device continues with normal operation to complete initialization of the SAS device and to perform desired application specific communications between the master SAS device and the other SAS device connected thereto. If element 202 determines that more SAS speeds need to be evaluated, element 204 is operable to perform standard SAS-2 compliant negotiation by participating in a speed negotiation window. Element 204 thereby determines whether the other SAS device also supports the current speed selected for testing in the master SAS device. Element 206 then determines whether the speed negotiation processing of element 204 determined that the SAS speed being evaluated is also supported by the other SAS device. If not, processing continues looping back to element 202 until all SAS speeds supported by the master device have been negotiated and tested.

If element 206 determines that the speed negotiation identified a mutually supported SAS speed for the master SAS device and the other SAS device couple thereto, element 208 is next operable to test the link (e.g., utilizing the PHY layer communications) to test actual operation of the link utilizing the negotiated, mutually supported speed. Details of the processing of element 208 are discussed further herein below with respect to FIG. 3. Element 210 is then operable to update the list of mutually supported SAS speeds with the test results generated by operation of element 208. As noted above, operation of element 200 establishes a list of mutually supported SAS speeds and stores the test results associated with the each mutually supported SAS speed. An administrative user or process may then manually or automatically select among the mutually supported, tested speeds to determine the preferred or optimal speed for the particular application of the master SAS device. Processing then continues looping back to element 202 until all SAS speeds are negotiated and tested to generate the list of mutually supported SAS speeds and associated test results.

Figure 3:
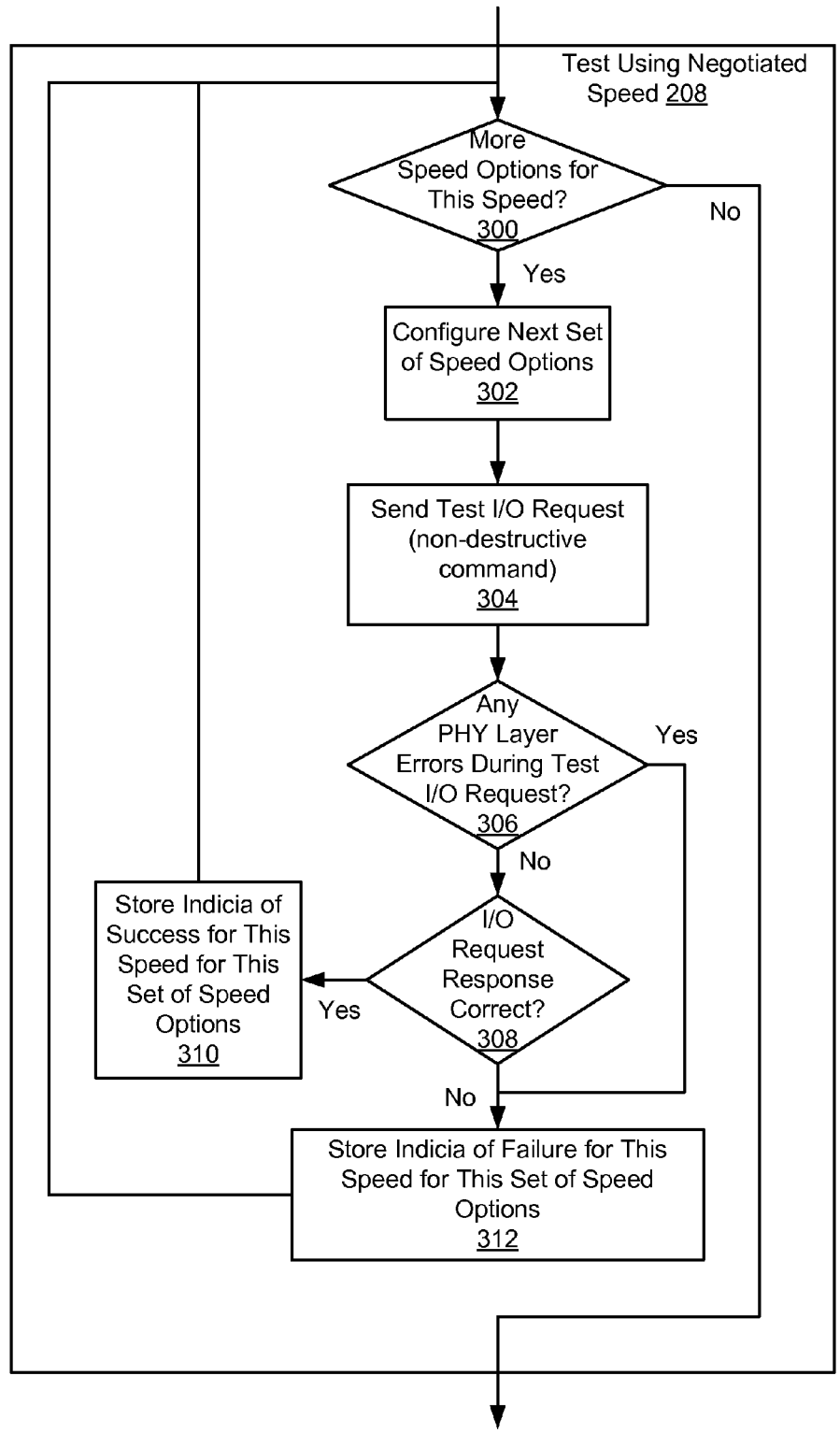

FIG. 3 provides exemplary additional details of the processing of element 208 of FIG. 2 to test a mutually supported negotiated SAS speed. Elements 300 through 312 are iteratively operable to evaluate each possible combination or set of SAS speed options for the current SAS speed being evaluated (e.g. the SAS speed just negotiated to identify it as mutually supported by both SAS devices). Element 300 first determines whether additional sets or combinations of speed options remain to be tested for this current SAS speed being evaluated. If not, processing of element 208 is completed and the speed negotiation and testing procedures of FIG. 2 above resume processing. Otherwise, element 302 is next operable to configure a next set or combination of SAS speed options to permit testing of the present SAS speed using another combination or set of speed options. As is generally known in the art, speed options for such a SAS link may include, for example, the link rate as well as the logical link rate and the spread spectrum clock rates and clocking types available for communication at the current SAS speed. These and other speed options are set by operation of element 302 prior to testing performed by element 304.

Element 304 is then operable to test the SAS link utilizing the current SAS speed and the current set of configured SAS speed options. In general, testing of element 304 may comprise generation and transmission of one or more SCSI requests from the master device directed to the other SAS device. Element 304 further comprises receiving and evaluating any response to the SCSI request. Based in part on the particular SCSI request and response received, if any, element 304 may determine success or failure of the SAS link as presently configured between the master SAS device and the other SAS device coupled thereto.

In one exemplary embodiment, the SCSI requests generated and transmitted by operation of element 304 may be non-destructive SCSI requests that will not negatively impact or modify any data stored on the other SAS device. Exemplary of such non-destructive SAS SCSI requests are, test unit ready, inquiry, read buffer, etc. Where the other SAS device is a device that does not risk the loss of stored data, other SCSI requests may be utilized as a matter of design choice without risk of loss of data.

In addition to determining success or failure of the SCSI request based on the SCSI request and the associated SCSI response, if any, element 306 further may determine success or failure of the test by evaluating how many if any PHY layer errors occurred during the performance of the SCSI exchange. In accordance with features and aspects hereof, counters or other indicia associated with PHY layer processing may identify and/or count the number of PHY layer errors that occurred during the SCSI request/response exchange. Exemplary of such PHY layer errors are 8b10b encoding errors, symbol errors, parity errors, DWORD synchronization errors, etc. Detection of such errors is generally known to those of ordinary skill in the art. If no PHY layer errors are detected, element 308 determines whether the SCSI request and associated response generated by testing of element 304 were otherwise processed correctly.

If no errors are detected during the testing of elements 304 through 308, element 310 is operable to store indicia of success for this present SAS speed and the presently configured set of speed options. Alternatively, if errors are detected in the processing of elements 304 through 308, element 312 is operable to store indicia of failure for this current SAS speed using this particular presently configured set of speed options. Following processing of the elements 310 or 312 to store appropriate success/failure indicia, processing continues looping back to element 300 to evaluate more sets of configured speed options for the present SAS speed.

Figure 4:
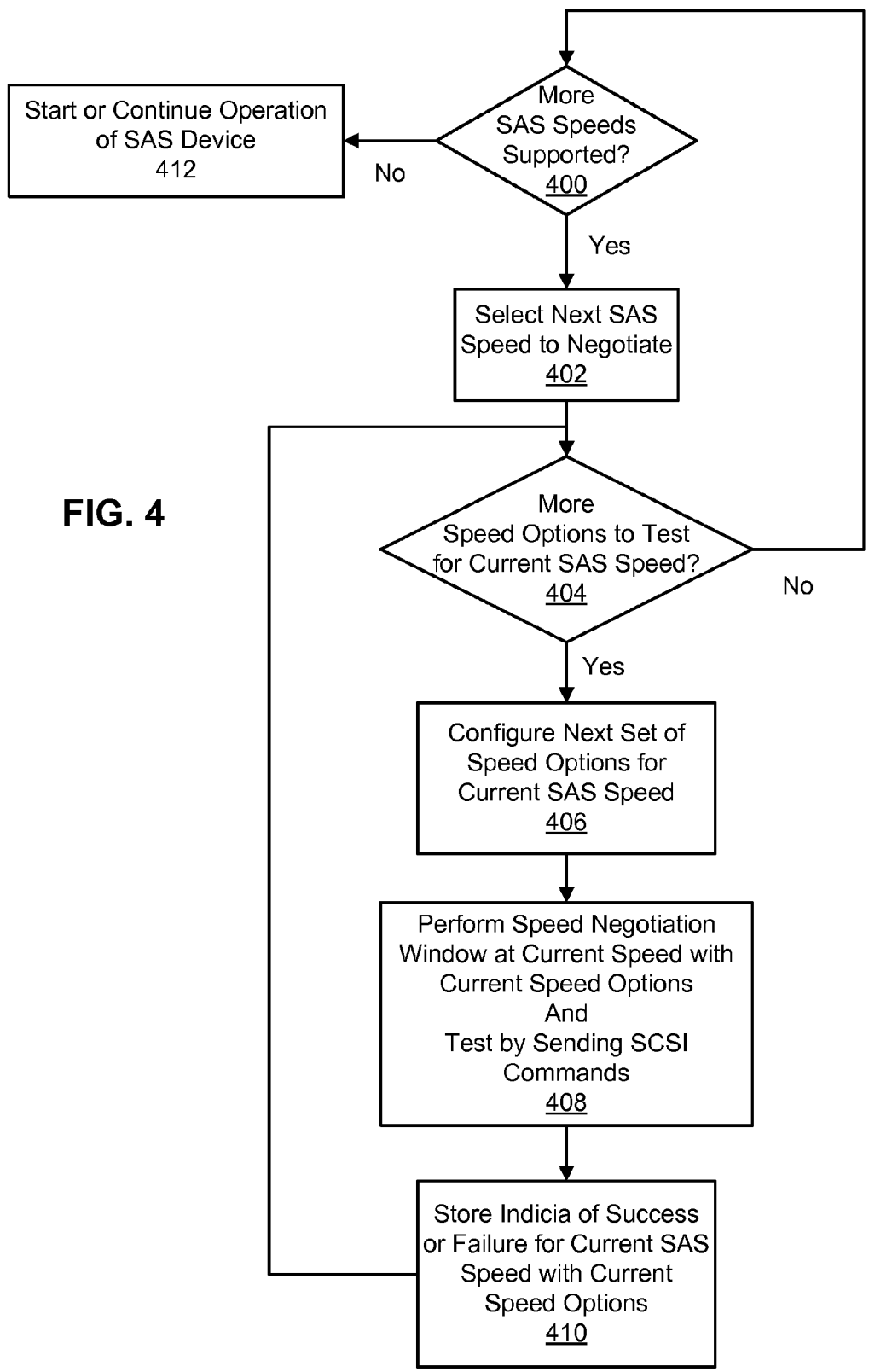

FIG. 4 is a flowchart describing another exemplary method in accordance with features and aspects hereof for testing a SAS link as an aspect of the speed negotiation processing between a master SAS device and an associated other SAS device. The method of FIG. 4 generally comprises iteratively testing one or more sets of configured speed options for each SAS speed supported by the master SAS device performing the negotiation process. In particular, elements 406 through 410 are performed for each set of speed options for each of the supported speeds of the master device. In general, these steps configure a next set of speed options to be utilized when participating in a speed negotiation window between the master SAS device and the other SAS device couple thereto. Next, the repeated steps perform a speed negotiation process generally in accordance with the SAS-2 specifications but enhanced to include testing of one or more configured sets of speed options at the current SAS speed to determine success or failure of the mutually supported SAS speed. Lastly, the repeated steps include storing indicia of success or failure of the speed negotiation and testing process for the current SAS speed at the currently configured set of speed options. These steps are then repeated for each combination of speed options and all supported SAS speeds until all mutually supported SAS speeds have been negotiated, tested, and test results appropriately stored for subsequent utilization.

More specifically, element 400 is operable to determine whether additional SAS speeds supported by the master SAS device remain to be negotiated and tested. If not, element 412 is operable to start or continue normal operation of the SAS device including, for example, selecting one of the tested, mutually supported SAS speeds. If more SAS speeds remain to be evaluated, element 402 is operable to select a next SAS speed to be utilized in performing speed negotiation and associated testing. Element 404 is then operable to determine whether additional sets of speed options remain to be tested at the currently selected SAS speed. If not, processing continues looping back to element 400 until all SAS speeds and all associated speed option settings have been negotiated and tested.

For the currently configured set of speed options and the currently selected SAS speed, elements 406 through 410 are operable as noted above to configure the speed options, participate in the speed negotiation window and associated testing, and to store indicia of success or failure for the current selected SAS speed with the currently configured set of speed options. Specifically, element 406 configures the next set of speed options for the currently selected SAS speed. Exemplary speed options may be as exemplified above and as appropriate for the particular application. Element 408 then participates in SAS speed negotiation window processing generally in accordance with the SAS-2 specifications. Further, element 408 is operable as enhanced by features and aspects hereof to test a SAS speed determined to be mutually supported by both the master device and the other SAS device coupled thereto. As noted above, the testing may comprise generating and transmitting SCSI requests from the master device to the other SAS device coupled thereto. In one exemplary embodiment where the other SAS device may store user supplied data, the particular SCSI commands sent for purposes of testing may be non-destructive of such user data. For example, SCSI inquiry, testing unit ready, and read buffer commands may be utilized to test the link between the master device and other SAS device without risk of destroying any user data stored in the other SAS device. Element 408 therefore generates and transmits an appropriate SCSI request and receives the response therefrom.

Based on the SCSI response and potentially other indicia of success or failure of the transmitted request and response, element 410 is then operable to store appropriate indicia of success or failure determined from the testing process for the currently selected SAS speed with the currently configured set of speed options. In general, the stored indicia may be stored in any suitable memory or register structure within the master SAS device such that the particular SAS speed and particular configured set of speed options are identified along with the results of the testing process for that configured speed and set of options. Such a table or register structure may then be utilized by an administrative user or process to permit manual or automated selection of a preferred or optimal SAS speed for the particular application and the particular environment. Following processing of elements 406 through 410, processing continues looping back to element 404 to determine whether additional sets of speed options need to be configured and tested.

As noted above, determination of success or failure of the testing performed by element 408 may include correct receipt of a SCSI response generated by the other SAS device in response to the SCSI request as well as monitoring of any PHY layer errors occurring during the SCSI exchange. The PHY layer may therefore include suitable indicia or counters to indicate occurrence of particular errors in the SCSI request/response exchange.

Figure 5:
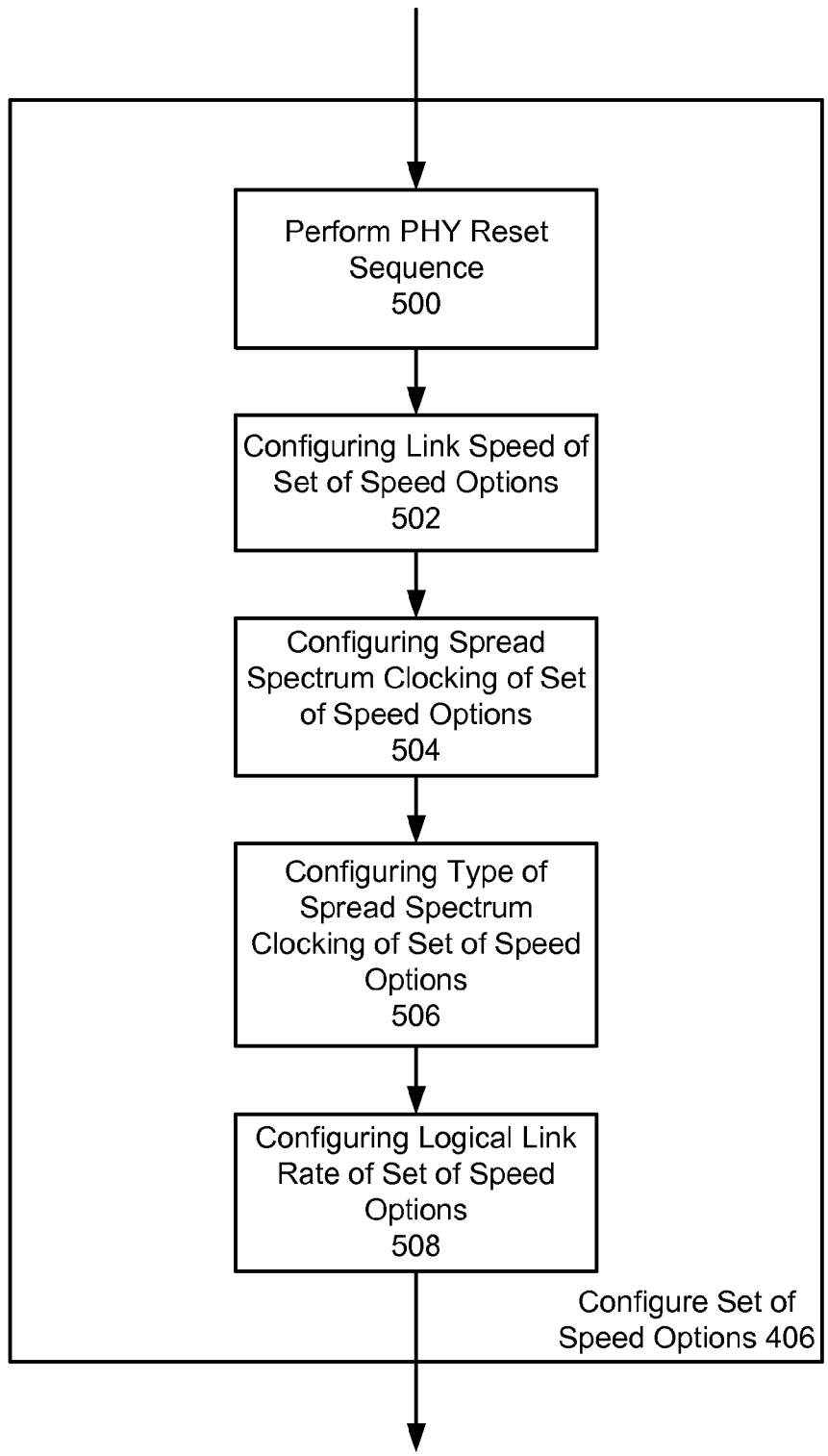

FIG. 5 is a flowchart providing exemplary additional details of the processing of element 406 of FIG. 4 to configure a next set of speed options prior to testing the link as presently configured. In advance of the testing of a particular set of speed options for a particular SAS speed, a PHY reset sequence is performed to permit initiation of the next speed negotiation window with a newly configured set of speed options. By so cycling the status of the link, the other SAS device will be prepared to perform a speed negotiation process again in response to the speed negotiation performed by the master SAS device and to respond to test commands in accordance with features and aspects hereof. Element 500 is thus operable to perform a PHY reset sequence in preparation for a new speed negotiation process. Elements 502 through 508 are then operable to configure each of the settings for the next set of speed options to be tested by operation of the method discussed above with respect to FIG. 4. Specifically, element 502 configures the link speed option of the current set of options, element 504 configures the spread spectrum clocking of the current set of speed options, element 506 configures the type of spread spectrum clocking of the set of speed options, and element 508 configures the logical link speed (used for SAS-2 multiplexing of a link) of the current set of speed options.

Those of ordinary skill in the art will readily recognize numerous additional and equivalent method steps associated with the processing of the methods of FIGS. 2 through 5 above. Such additional and equivalent steps are eliminated here simply for brevity of this discussion. In addition, those of ordinary skill in the art will readily recognize standard processing within a SAS device to utilize a list of mutually supported, tested SAS speeds for purposes of selecting a preferred or optimal SAS speed for the particular link in the particular application.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for serial attached SCSI ("SAS") control, the method comprising:
    performing speed negotiation between a first and second SAS device, each speed negotiated during a corresponding speed negotiation window, wherein the speed negotiation generates a list of supported SAS speeds;
    testing each SAS speed in the list of supported SAS speeds to determine success or failure of said each SAS speed in exchanges between the first and second SAS devices wherein the step of testing further comprises testing each set of speed option of a plurality of sets of speed options for each SAS speed in the list; and
    eliminating, responsive to the step of testing, any failed SAS speed from the list of supported SAS speeds where all sets of speed options for the SAS speed failed the testing.

2. The method of claim 1
    wherein the step of testing further comprises:
    performing a SCSI request exchanged between the first and second devices to determine success or failure of said each speed based on success or failure of the performance of the exchanged SCSI request.

3. The method of claim 2
    wherein at least one of the first and second devices stores data and wherein the SCSI request is non-destructive of the stored data.

4. The method of claim 3
    wherein the non-destructive SCSI request may include one or more of: Test Unit Ready, Read Buffer, and Inquiry.

5. The method of claim 1
wherein the step of testing further comprises:
sensing errors in the PHY layer processing of the exchanged SCSI request to determine success or failure of said each SAS speed.

6. The method of claim 5
wherein the step of sensing further comprises:
sensing one or more PHY layer errors wherein each PHY layer error may include: an 8b10b encoding error, and/or a symbol error, and/or a parity error, and/or a DWORD synchronization loss error.

7. The method of claim 1
wherein the speed options include one or more of: link speed, spread spectrum clocking for each SAS speed, types of supported spread spectrum clocking, and logical link rates in support of multiplexing.

8. A SAS device comprising:
a PHY layer for physical link media control of each PHY of the SAS device;
a speed negotiation element adapted to perform speed negotiation between the SAS device and each other SAS device coupled to a corresponding PHY of the SAS device, wherein the speed negotiator is adapted such that each SAS speed is negotiated during a corresponding speed negotiation window, wherein the speed negotiation for each PHY generates a corresponding list of supported SAS speeds; and
a speed options testing element responsive to negotiation of each SAS speed and adapted to test each of a plurality of sets of speed options for each SAS speed in the list of supported SAS speeds to determine success or failure of each set of speed options of said each SAS speed in exchanges between the SAS device and each other SAS device, and
wherein the speed negotiation element is further adapted responsive to the speed options testing element, to eliminate any failed SAS speed from the list of supported SAS speeds where all sets of speed options for the SAS speed failed the testing.

9. The device of claim 8
wherein the speed options testing element further comprises:
a memory for storing information regarding each SAS speed tested for each other SAS device.

10. The device of claim 9
wherein the memory includes:
speed options memory for storing each set of speed options tested for each other SAS device and the results of the speed test for each set of speed options.

11. The device of claim 10
wherein each PHY layer includes:
a counter for each type of PHY layer error that may be sensed in any exchange between the SAS device and another SAS device coupled to said each PHY layer,
and wherein the memory includes:
PHY error memory for storing PHY error counter values for each set of speed options tested for each other SAS device.

12. A method for speed negotiation between a master SAS device and another SAS device coupled to a corresponding PHY layer of the master SAS device, the method comprising
configuring a set of speed options for speed negotiation between the master SAS device and said another SAS device;
participating a SAS speed negotiation window to determine success or failure of the currently configured set of speed options, wherein the step of participating comprises sending one or more SCSI commands from the master SAS device to said another SAS device to test the currently configured set of speed options;
storing indicia of the success or failure of the speed negotiation;
repeating the steps of configuring, participating, and storing, for each possible set of speed options for each supported SAS speed of the master SAS device.

13. The method of claim 12
wherein sending one or more SCSI commands comprises sending one or more non-destructive SCSI commands.

14. The method of claim 12
wherein the step of configuring a set of speed options comprises:
configuring a link speed;
configuring a spread spectrum clocking for each SAS speed;
configuring a type of supported spread spectrum clocking; and
configuring a logical link rate in support of multiplexing.

15. The method of claim 12
wherein the step of repeating further comprises:
performing a PHY reset sequence prior to configuring a next possible set of speed options in advance of a next speed negotiation window between the master SAS device and said another SAS device.

16. The method of claim 12 further comprises:
generating a list of SAS speeds tested during speed negotiation processing, each entry in the list indicating the set of speed options tested and the results of the test.

17. The method of claim 16 further comprising:
communicating the list of SAS speeds tested to a utilization means for further processing to select a preferred SAS speed for communications between the master SAS device and said another SAS device.

* * * * *